US008265703B2

(12) United States Patent
Hwang

(10) Patent No.: US 8,265,703 B2
(45) Date of Patent: Sep. 11, 2012

(54) METHOD OF RUNNING APPLICATION AND MOBILE COMMUNICATION TERMINAL USING THE SAME

(75) Inventor: Min-Woong Hwang, Seoul (KR)

(73) Assignee: Samsung Electronics Co., Ltd (KR)

(*) Notice: Subject to any disclaimer, the term of this patent is extended or adjusted under 35 U.S.C. 154(b) by 1158 days.

(21) Appl. No.: 11/594,277

(22) Filed: Nov. 8, 2006

(65) Prior Publication Data

US 2007/0105597 A1    May 10, 2007

(30) Foreign Application Priority Data

Nov. 9, 2005    (KR) .................. 10-2005-0107173

(51) Int. Cl.
    *H04M 1/00*    (2006.01)
(52) U.S. Cl. ........ 455/566; 345/156; 345/157; 345/165; 345/166; 345/167; 345/168; 345/169; 345/170; 345/171; 345/172; 345/173; 345/174; 345/184
(58) Field of Classification Search .................. 345/156, 345/157, 184, 165–174
    See application file for complete search history.

(56) References Cited

U.S. PATENT DOCUMENTS

| 5,946,647 | A | * | 8/1999 | Miller et al. ........................ 704/9 |
| 6,057,845 | A | * | 5/2000 | Dupouy ........................ 715/863 |
| 6,668,081 | B1 | * | 12/2003 | Ilan et al. ........................ 382/187 |
| 7,292,870 | B2 | * | 11/2007 | Heredia et al. ................ 455/466 |
| 7,448,032 | B2 | * | 11/2008 | Bourbonnais ................ 717/173 |
| 2002/0058536 | A1 | | 5/2002 | Horii et al. |
| 2004/0207601 | A1 | * | 10/2004 | SanGiovanni ................ 345/156 |
| 2006/0013487 | A1 | * | 1/2006 | Longe et al. ................ 382/229 |
| 2006/0035632 | A1 | * | 2/2006 | Sorvari et al. ................ 455/418 |
| 2006/0116139 | A1 | * | 6/2006 | Appelman ................ 455/466 |
| 2007/0040811 | A1 | * | 2/2007 | Yang et al. ................ 345/173 |

FOREIGN PATENT DOCUMENTS

| CN | 1353557 | 6/2002 |
| EP | 0 917 038 | 5/1999 |
| EP | 1 032 183 | 8/2000 |
| EP | 1 087 305 | 3/2001 |
| KR | 1020000059719 A | 10/2000 |
| KR | 1020040054048 A | 6/2004 |
| WO | WO 01/22262 | 3/2001 |

OTHER PUBLICATIONS

Pandit et al., Association for Computing Machinery: "The Selection Recognition Agent: Instant Access to Relevant Information and Operations", 1997 International Conference on Intelligent User Interfaces, Jan. 6, 1997.

* cited by examiner

*Primary Examiner* — Dwayne Bost
*Assistant Examiner* — Edward Zhang
(74) *Attorney, Agent, or Firm* — The Farrell Law Firm, P.C.

(57) ABSTRACT

A method of running an application in a mobile communication terminal is disclosed. The method includes, if a predetermined key-value is input on a standby screen, analyzing the key-value to determine which application (or applications) to run; setting a parameter for running the application determined according to the key-value analysis result as the key-value; and running the application using the set parameter. A mobile communication terminal for running an application includes: a key input unit for receiving a predetermined key-value on a standby screen; a controller for if the key-value is input through the key input unit, analyzing the key-value to determine which application to run and setting a parameter for running the application determined according to the key-value analysis result as the key-value; and an application driver for running the application using the parameter set by the controller.

20 Claims, 6 Drawing Sheets

METHOD OF RUNNING APPLICATION AND MOBILE COMMUNICATION TERMINAL USING THE SAME

PRIORITY

This application claims priority under 35 U.S.C. §119 to an application entitled "Method of Running Application and Mobile Communication Terminal Using the Same" filed in the Korean Intellectual Property Office on Nov. 9, 2005 and assigned Serial No. 2005-107173, the contents of which are incorporated herein by reference.

BACKGROUND OF THE INVENTION

1. Field of the Invention

The present invention relates generally to a mobile communication terminal, and in particular, to a method of running an application and a mobile communication terminal using the same.

2. Description of the Related Art

In general, if a user of a mobile communication terminal desires to run a predetermined application, the user must enter into an environment suitable for directly running the application. That is, the user is inconvenienced by having to perform several key operations to enter into an environment for directly running a desired application on a standby screen.

SUMMARY OF THE INVENTION

An object of the present invention is to substantially solve at least the above problems and/or disadvantages and to provide at least the advantages below. Accordingly, an object of the present invention is to provide a method of running an application on a standby screen and a mobile communication terminal using the same.

According to one aspect of the present invention, there is provided a method of running an application in a mobile communication terminal, the method including if a predetermined key-value is input on a standby screen, analyzing the key-value to determine which application runs; setting a parameter for running an application determined according to the key-value analysis result as the key-value; and running the application using the set parameter.

According to another aspect of the present invention, there is provided a mobile communication terminal for running an application, the mobile communication terminal including a key input unit for receiving a predetermined key-value on a standby screen; a controller for inputting the key-value through the key input unit, analyzing the key-value to determine which application runs, and setting a parameter for running an application determined according to the key-value analysis result as the key-value; and an application driver for running the application using the parameter set by the controller.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

Figure 1:
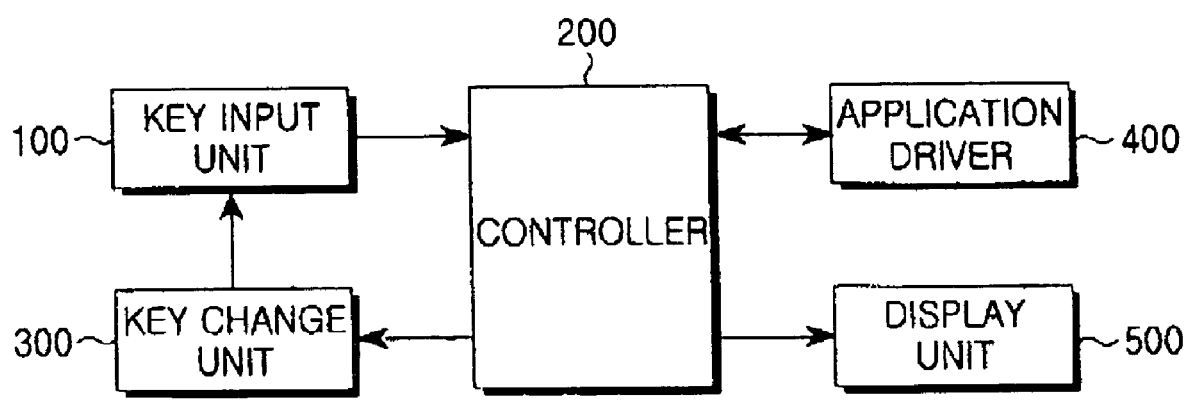
FIG. 1 is a diagram of a mobile communication terminal for running an application on a standby screen according to the present invention.

FIG. 1 is a diagram of a mobile communication terminal for running an application on a standby screen according to the present invention.

Referring to FIG. 1, a key input unit 100 receives a predetermined key-value for running an application on a standby screen of the mobile communication terminal and outputs the input key-value to a controller 200. A key change unit 300 changes a mode of keys selectable on the standby screen. For example, if key input modes include Korean, English, and number modes, and if a key for changing a key input mode is selected on the standby screen through the key input unit 100, the controller 200 detects the key selection and changes a current key input mode of the standby screen to another key input mode through the key change unit 300. If the current key input mode of the standby screen is the Korean mode, the Korean mode is changed to the English or number mode, and if the current key input mode of the standby screen is the English mode, the English mode is changed to the Korean or number mode. A change order of the key input modes can be previously set and changed.

If the predetermined key-value is input on the standby screen of the mobile communication terminal through the key input unit 100, the controller 200 analyzes the input key-value to determine which application runs. The controller 200 searches an application to be run according to the analysis result and sets a parameter for running the predetermined application as the key-value. Herein, the parameter can be a telephone number, an instant messenger identification (ID), an Internet site address, or an e-mail address as illustrated in FIGS. 2 to 9. An application driver 400 runs the found application using the parameter set by the controller 200, and a display unit 500 displays an operation screen of the mobile communication terminal.

A process of directly running an application on the standby screen of the mobile communication terminal by the controller 200 analyzing a key-value input on the standby screen through the key input unit 100 to determine which application runs will now be described in detail with reference to FIGS. 2 to 9.

FIGS. 2 to 9 are screen-shots illustrating screens for explaining a process of running an application using a key-value input on a standby screen of a mobile communication terminal according to the present invention.

Figure 2:
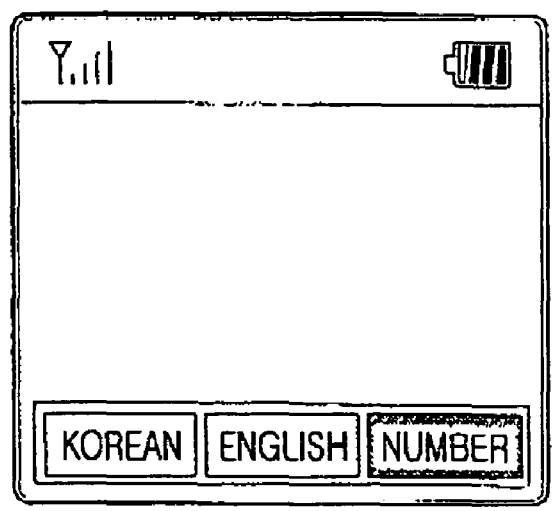
FIGS. 2 to 9 illustrate screens for explaining a process of running an application using a key-value input on a standby screen of a mobile communication terminal according to the present invention.

FIG. 2 illustrates the standby screen of the mobile communication terminal, which is displayed on the display unit 500. An icon indicating modes of currently selectable keys is displayed on the bottom right corner of the standby screen. If a key for changing a key input mode through the key input unit 100 is selected on the standby screen, the controller 200 detects the key selection and changes a current key input mode of the standby screen to another key input mode through the key change unit 300. The controller 200 also changes a key input mode indicated by the icon. That is, a key input may be performed in various modes, e.g., the Korean, English, and/or number modes.

Figure 3:
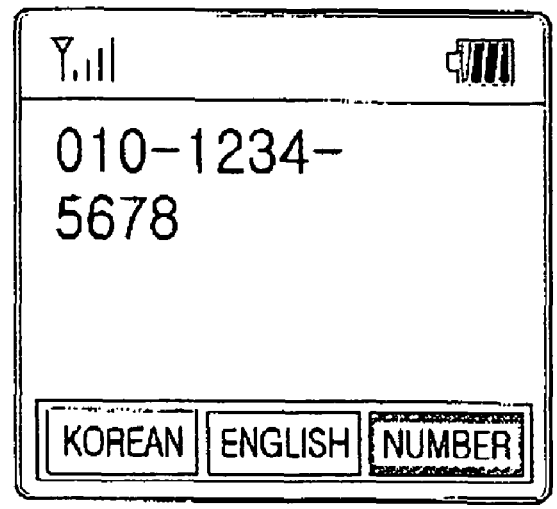

A user can input a telephone number on the standby screen through the key input unit 100 to make a call as illustrated in FIG. 3. If the telephone number is completely input, i.e., if a call key or an OK key indicating that an input operation of a key-value is completed is finally selected, the controller 200 analyzes the key-value input through the key input unit 100 to determine which application runs. If the key-value input on the standby screen includes only numerals the controller 200 may optionally analyze the key-value as a key-value for performing a call connection. Accordingly, the controller 200 may set the key-value as a telephone number of a called party and may perform the call connection through the application driver 400.

Figure 4:
Figure 5:
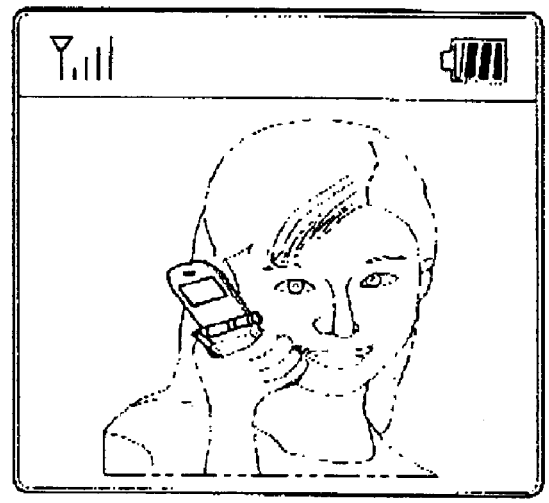

As illustrated in FIG. 4, the user can input a target ID on the standby screen through the key input unit 100 to use an instant messenger (IM) service, e.g., Voice over Internet Service (VoIP) or Push-to-All (PTA). If a current key input mode of the standby screen is the number mode, the user can input the target ID by changing the current key input mode to the Korean or English mode. If the target ID is completely input, the controller 200 analyzes a key-value input through the key input unit 100 to determine which application should run. If the key-value input on the standby screen includes characters, the controller 200 may analyze the key-value as a key-value for running the IM service. Accordingly, the controller 200 determines whether an ID matching the key-value exists among IDs (Identification) registered in an instant messenger installed in the mobile communication terminal. If the ID matching the key-value exists as the checking result, the controller 200 connects the IM service through the application driver 400 using the matched ID. FIG. 5 illustrates PTA, which is a type of IM service. That is, a figure shown on a screen of FIG. 5 is a member registered in the IM service who has an ID corresponding to the key-value input by the user, and the user can directly perform a PTA connection with the member having the ID by inputting the ID registered in the IM service on the standby screen.

Figure 6:
Figure 7:
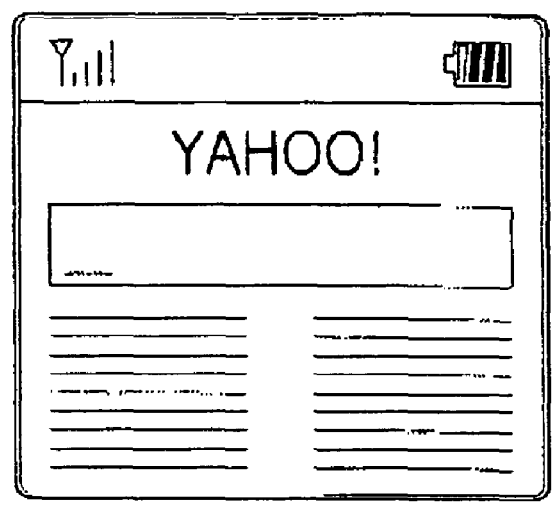

As illustrated in FIG. 6, the user can input a Uniform Resource Locator (URL) of a specific site on the standby screen through the key input unit 100 to access the specific site. If the URL is completely input, the controller 200 analyzes a key-value input through the key input unit 100 to determine which application should run. If the key-value input on the standby screen begins with "www.", the controller 200 may analyze the key-value as a key-value for running a web browser. Accordingly, the controller 200 may access the URL corresponding to the key-value by running the browser installed in the mobile communication terminal through the application driver 400. FIG. 7 illustrates a screen of a site corresponding to the URL input on the standby screen by the user. That is, the user can directly access a desired Internet site by inputting a URL of the desired Internet site on the standby screen.

Figure 8:
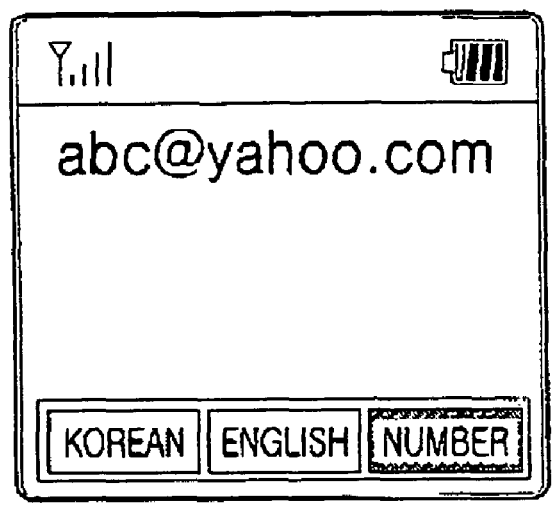
Figure 9:
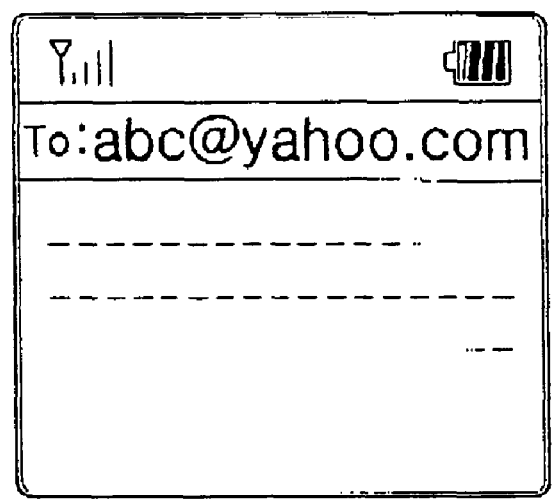

As illustrated in FIG. 8, the user can input an e-mail address of a specific party on the standby screen through the key input unit 100 to transmit an email to the specific party. If the e-mail address is completely input, the controller 200 may analyze a key-value input through the key input unit 100 to determine which application should run. If the key-value input on the standby screen includes characters such as "@" and ".", the controller 200 may analyze the key-value as a key-value for running an e-mail edit application. Accordingly, the controller 200 sets the e-mail address corresponding to the key-value as an e-mail address of a reception party by running the e-mail edit application installed in the mobile communication terminal through the application driver 400. FIG. 9 illustrates the e-mail edit application for inputting contents in a state where the e-mail address input on the standby screen by the user is set as an e-mail address of a reception party. That is, the user can directly run the e-mail edit application by inputting an e-mail address of a reception party to whom an e-mail is to be transmitted on the standby screen.

The processes of analyzing a key-value input on the standby screen to determine which should application run, which are illustrated in FIGS. 2 to 9, can be performed using various methods in addition to the above-described methods.

A process of running an application according to a key-value input on the standby screen in the mobile communication terminal according to the present invention will now be described with reference to FIG. 10.

Figure 10:
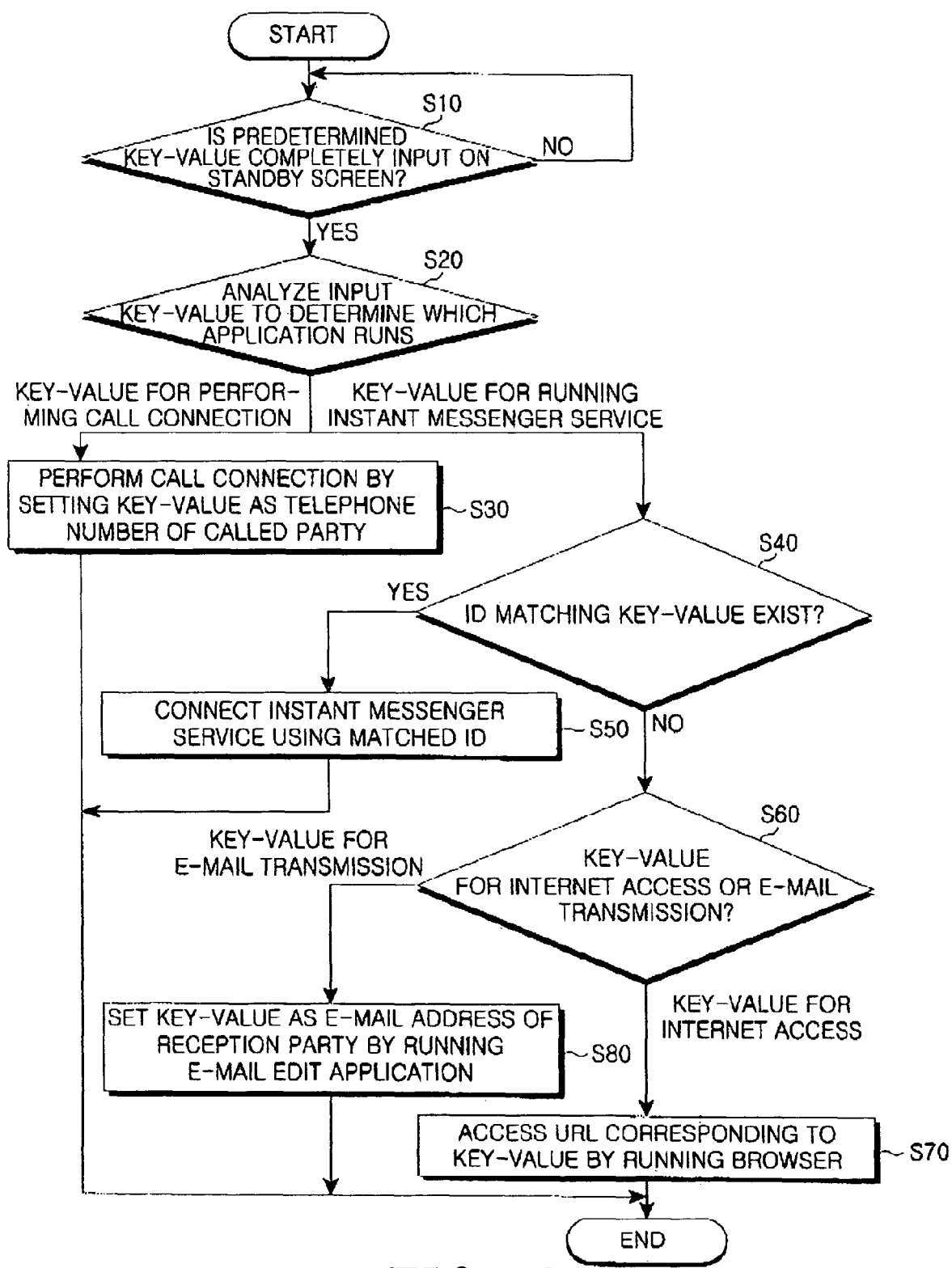
FIG. 10 is a flowchart illustrating a method of running an application on a standby screen according to the present invention.

FIG. 10 is a flowchart illustrating a method of running an application on the standby screen according to of the present invention.

The user of the mobile communication terminal can input a parameter for running a desired application by changing a key input mode according to a current key input status to directly run the desired application on the standby screen. The controller 200 determines whether a predetermined key-value is completely input on the standby screen of the mobile communication terminal through the key input unit 100 in step S10.

If the predetermined key-value is completely input as a result of the determination, the controller 200 analyzes the input key-value to determine which application (or applications) should run in step S20. If the key-value is determined to contain numerals in step S20, the controller 200 analyzes the key-value as a key-value for performing a call connection. In this case, the controller 200 sets the key-value as a telephone number of a called party and performs a call connection through the application driver 400 in step S30.

If it is determined that the key-value includes characters in step S20, the controller 200 analyzes the key-value as a key-value for running an IM service. In this case, the controller 200 determines in step S40 whether an ID matching the key-value exists among IDs registered in an IM installed in the mobile communication terminal. If the ID matching the key-value exists as a result of the determination in step S40, the controller 200 connects the instant messenger service through the application driver 400 using the matched ID in step S50. Accordingly, the user can directly use the IM service with a desired party on the standby screen.

If it is determined that no ID matching the key-value exists as a result of the determination in step 40, the controller 200 determines in step S60 whether the key-value is a key-value for performing an Internet access with a specific site or a key-value for transmitting an e-mail to a specific party. Since a process of analyzing whether the key-value input on the standby screen is a key-value for performing an Internet access with a specific site or a key-value for transmitting an e-mail to a specific party has been described with reference to FIGS. 2 to 9, description of the process is omitted for the sake of clarity. If the key-value is determined to be a key-value, i.e., a specific URL, for performing an Internet access with a specific site as a result of the determination in step S60, the controller 200 accesses the specific URL by running a browser installed in the mobile communication terminal through the application driver 400 in step S70. Accordingly, the user can directly access a desired Internet site on the standby screen.

If it is determined that the key-value is a key-value, i.e., a specific e-mail address, for transmitting an e-mail to a specific party as a result of the determination in step S60, the controller 200 sets the specific e-mail address as an e-mail address of a reception party by running an e-mail edit application installed in the mobile communication terminal through the application driver 400. Accordingly, the user can edit desired contents and transmit an e-mail to the reception party by directly running the e-mail edit application on the standby screen.

As described above, according to the present invention, by running an application corresponding to a key-value input on a standby screen of a mobile communication terminal, a user can easily use a desired application.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of running an application in a mobile communication terminal, the method comprising:
   receiving, on a standby screen, input of a text-string;
   analyzing the input text-string;
   determining an application to run according to a result of the analysis;
   setting, to the text-string, a parameter for running the determined application;
   running the determined application using the set parameter, wherein determining the application, setting the parameter, and running the determined application are all performed upon a determination that input of the text-string is complete without requiring receipt of additional user input for running the determined application;
   when it is determined that the text-string includes characters, checking whether an IDentification (ID) matching the text-string exists from among IDs registered in an Instant Messenger (IM); and
   when it is determined that the ID matching the text-string exists, connecting an IM service using the matched ID.

2. The method of claim 1, wherein the IM service includes at least one of a Voice over Internet Service (VoIP) and a Push-to-All (PTA) service.

3. The method of claim 1, further comprising changing a mode of keys selectable on the standby screen.

4. The method of claim 1, wherein when the text-string includes numerals, a call connection is performed by setting, to the text-string, a telephone number of a party to be called.

5. A method of running an application in a mobile communication terminal, the method comprising:
   receiving, on a standby screen, input of a text-string;
   analyzing the input text-string;
   determining an application to run according to a result of the analysis;
   setting, to the text-string, a parameter for running the determined application;
   running the determined application using the set parameter, wherein determining the application, setting the parameter, and running the determined application are all performed upon a determination that input of the text-string is complete without requiring receipt of additional user input for running the determined application; and
   when the text-string is analyzed as a Uniform Resource Locator (URL) a Web browser is opened and the URL corresponding to the text-string is accessed using the browser.

6. The method of claim 5, further comprising changing a mode of keys selectable on the standby screen.

7. The method of claim 5, wherein when the text-string includes numerals, a call connection is performed by setting, to the text-string, a telephone number of a party to be called.

8. A method of running an application in a mobile communication terminal, the method comprising:
   receiving, on a standby screen, input of a text-string;
   analyzing the input text-string;
   determining an application to run according to a result of the analysis;
   setting, to the text-string, a parameter for running the determined application;
   running the determined application using the set parameter, wherein determining the application, setting the parameter, and running the determined application are all performed upon a determination that input of the text-string is complete without requiring receipt of additional user input for running the determined application; and
   when the text-string is analyzed as an e-mail address, setting, to the analyzed e-mail address, an e-mail address of a reception party by running an e-mail edit application.

9. The method of claim 8, further comprising changing a mode of keys selectable on the standby screen.

10. The method of claim 8, wherein when the text-string includes numerals, a call connection is performed by setting, to the text-string, a telephone number of a party to be called.

11. A mobile communication terminal for running an application, the mobile communication terminal comprising:
   a key input unit for receiving a predetermined text-string on a standby screen;
   a controller for:
      when the text-string is input through the key input unit, analyzing the text-string to determine an application to run; and
      setting, to the text-string, a parameter for running the determined application; and
   an application driver for running the determined application using the parameter set by the controller,
   wherein determining the application, setting the parameter, and running the determined application are all performed upon a determination that input of the text-string is complete without requiring receipt of additional user input for running the determined application, and
   wherein when the text-string includes characters, and when an IDentification (ID) matching the text-string exists among IDs registered in an Instant Messenger (IM), the controller connects an IM service through the application driver using the matched ID.

12. The mobile communication terminal of claim 11, wherein the instant messenger service includes at least one of a Voice over Internet Service (VoIP) and a Push-to-All (PTA) service.

13. The mobile communication terminal of claim 11, further comprising a key change unit for changing a mode of keys selectable on a standby screen,
   wherein when the controller receives a key input signal for changing a key input mode through the key input unit, the controller changes a current key input mode to another key input mode.

14. The mobile communication terminal of claim 11, wherein when the text-string includes numerals, the controller performs a call connection through the application driver by setting, to the text-string, a telephone number of a party to be called.

15. A mobile communication terminal for running an application, the mobile communication terminal comprising:
a key input unit for receiving a predetermined text-string on a standby screen;
a controller for:
when the text-string is input through the key input unit, analyzing the text-string to determine an application to run; and
setting, to the text-string, a parameter for running the determined application; and
an application driver for running the determined application using the parameter set by the controller,
wherein determining the application, setting the parameter, and running the determined application are all performed upon a determination that input of the text-string is complete without requiring receipt of additional user input for running the determined application, and
wherein when it is determined that the text-string is a Uniform Resource Locator (URL), the controller opens a web browser and accesses the URL corresponding to the text-string using the browser through the application driver.

16. The mobile communication terminal of claim 15, further comprising a key change unit for changing a mode of keys selectable on a standby screen,
wherein when the controller receives a key input signal for changing a key input mode through the key input unit, the controller changes a current key input mode to another key input mode.

17. The mobile communication terminal of claim 15, wherein when the text-string includes numerals, the controller performs a call connection through the application driver by setting, to the text-string, a telephone number of a party to be called.

18. A mobile communication terminal for running an application, the mobile communication terminal comprising:
a key input unit for receiving a predetermined text-string on a standby screen;
a controller for:
when the text-string is input through the key input unit, analyzing the text-string to determine an application to run; and
setting, to the text-string, a parameter for running the determined application; and
an application driver for running the determined application using the parameter set by the controller,
wherein determining the application, setting the parameter, and running the determined application are all performed upon a determination that input of the text-string is complete without requiring receipt of additional user input for running the determined application, and
wherein when the text-string is analyzed as an e-mail address, the controller sets, to the analyzed e-mail address, an e-mail address of a reception party by running an e-mail edit application through the application driver.

19. The mobile communication terminal of claim 18, further comprising a key change unit for changing a mode of keys selectable on a standby screen,
wherein when the controller receives a key input signal for changing a key input mode through the key input unit, the controller changes a current key input mode to another key input mode.

20. The mobile communication terminal of claim 18, wherein when the text-string includes numerals, the controller performs a call connection through the application driver by setting, to the text-string, a telephone number of a party to be called.

* * * * *